United States Patent [19]
Dix et al.

[11] Patent Number: 5,389,110
[45] Date of Patent: Feb. 14, 1995

[54] AZO DYES AND PROCESS OF DYEING WITH AZO DYES WHICH CONTAIN AN N-(HYDROXYSULFONYLPHENYLALKYL)-PYRIDONE COUPLING COMPONENT

[75] Inventors: Johannes P. Dix, Weisenheim; Bernd Hupfeld, Speyer; Gunther Lamm, Hassloch; Helmut Reichelt, Neustadt, all of Germany

[73] Assignee: BASF Aktiengesellschaft, Ludwigshafen, Germany

[21] Appl. No.: 107,619

[22] Filed: Aug. 18, 1993

[30] Foreign Application Priority Data

Aug. 20, 1992 [DE] Germany ................. 4227590

[51] Int. Cl.$^6$ ............................. C09B 29/42
[52] U.S. Cl. ............................. 8/670; 8/437; 8/531; 8/641; 8/669; 8/687; 8/917; 8/924; 534/771; 546/297
[58] Field of Search ............ 8/641, 670, 669, 687, 8/437, 531, 917, 924; 534/771; 546/297

[56] References Cited

U.S. PATENT DOCUMENTS 5,163,971  11/1992  Stawitz et al. ............ 8/641

FOREIGN PATENT DOCUMENTS 0111236   6/1984   European Pat. Off. .
0126324  11/1984   European Pat. Off. .
0341214  11/1989   European Pat. Off. .
0385330   9/1990   European Pat. Off. .
2280688   2/1976   France .
2286176   4/1976   France .
2394585   1/1979   France .
1901711   4/1970   Germany .
1813385   7/1970   Germany .
2004487   8/1971   Germany .
1817977   2/1976   Germany .
3316887  11/1984   Germany .
 526677   9/1972   Switzerland .
2016501   9/1979   United Kingdom .
WO86/01815  3/1986  WIPO .
WO92/14791  9/1992  WIPO .

Primary Examiner—Paul Lieberman
Assistant Examiner—Caroline L. Dusheck
Attorney, Agent, or Firm—Oblon, Spivak, McClelland, Maier & Neustadt

[57] ABSTRACT

Azo dyes useful for dyeing natural or synthetic substrates have the formula

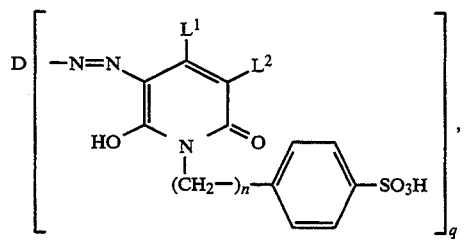

where
n is from 1 to 4,
q is 1 or 2,
$L^1$ is hydrogen or $C_1$–$C_3$-alkyl,
$L^2$ is acetyl, carbamoyl or hydroxysulfonyl, and
D is the radical of a diazo component.

5 Claims, No Drawings

AZO DYES AND PROCESS OF DYEING WITH AZO DYES WHICH CONTAIN AN N-(HYDROXYSULFONYLPHENYLALKYL)PYRIDONE COUPLING COMPONENT

The present invention relates to novel azo dyes of the formula I

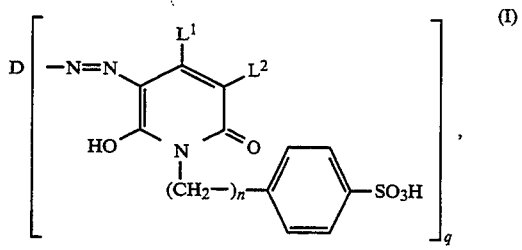

where
n is from 1 to 4,
q is 1 or 2,
$L^1$ is hydrogen or $C_1$–$C_3$-alkyl,
$L^2$ is acetyl, carbamoyl or hydroxysulfonyl, and
D (for q=1) is a radical of the formula

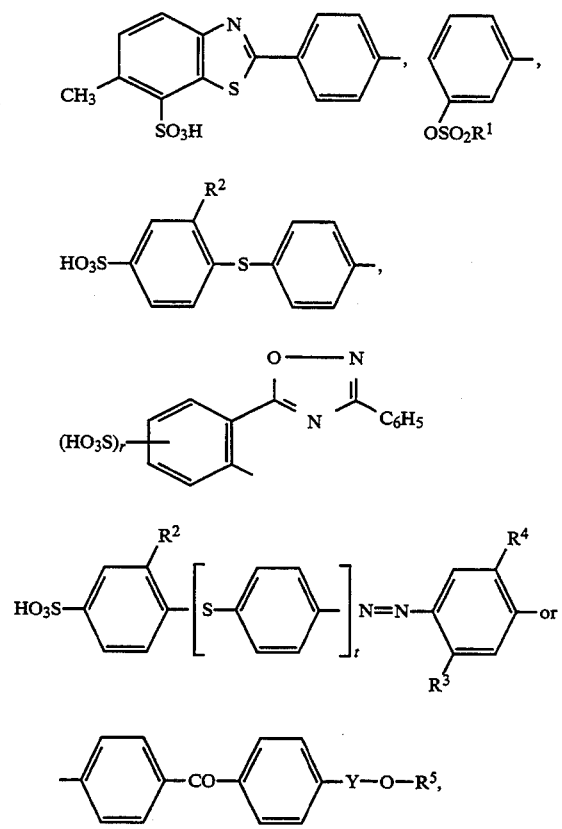

where r is 0 or 1 t is 0 or 1, $R^1$ is phenyl or $C_1$–$C_4$-alkylphenyl, $R^2$ is hydrogen or nitro, $R^3$ and $R^4$ are each independently of the other hydrogen, $C_1$–$C_4$-alkyl or $C_1$–$C_4$-alkoxy, $R^5$ is hydrogen or $C_1$–$C_4$-alkanoyl, Y is $C_1$–$C_4$-alkylene, or (for q=2) is a radical of the formula

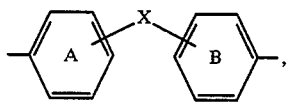

where X is a bridge member and rings A and B may each be substituted independently of one another, but the radicals

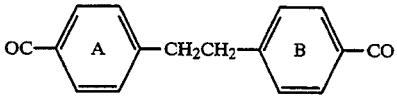

and

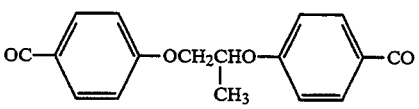

are excluded as bridge members, and to their use for dyeing natural or synthetic substrates.

The novel azo dyes of the formula I can be present either in the form of the free acid or else as salts.

Metal and ammonium salts are suitable. Metal salts can in particular be lithium, sodium or potassium salts. Ammonium salts for the purposes of the present invention are salts with substituted or unsubstituted ammonium cations. Examples of substituted ammonium cations are monoalkyl-, dialkyl-, trialkyl-, tetraalkyl- or benzyltrialkyl-ammonium cations or cations derived from nitrogen-containing five- or six-membered saturated heterocycles, such as pyrrolidinium, piperidinium, morpholinium, piperazinium or N-alkylpiperazinium cations or their N-monoalkyl- or N,N-dialkyl-substituted products. Here alkyl is to be understood as meaning in general straight-chain or branched $C_1$–$C_{20}$-alkyl which may be substituted by hydroxyl groups and/or interrupted by 1 to 4 oxygen atoms in ether function.

The earlier patent application PCT/EP 92/00281 describes dyes of a similar structure. Furthermore, DE-A-3 316 887 describes an azo dye whose coupling component is 1-hydroxysulfonylbenzyl-3-hydroxysulfonyl-4-methyl-6-hydroxypyrid-2-one and whose diazo component is 2-hydroxysulfonyl-4-ethoxyaniline.

It is an object of the present invention to provide novel azo dyes which have 1-(hydroxysulfonyl-phenylalkyl)-6-hydroxypyrid-2-ones as coupling components and which have advantageous application properties.

We have found that this object is achieved by the azo dyes of the formula I defined at the beginning.

Any alkyl or alkylene appearing in the above-mentioned formula I may be either straight-chain or branched.

$L^1$, $R^3$ and $R^4$ are each for example methyl, ethyl propyl or isopropyl.

$R^3$ and $R^4$ may each also be for example butyl, isobutyl, sec-butyl, methoxy, ethoxy, propoxy, isopropoxy, butoxy, isobutoxy or sec-butoxy.

$R^1$ is for example phenyl, 2-, 3- or 4-methylphenyl or 2-, 3- or 4-ethylphenyl.

$R^5$ is for example formyl, acetyl, propionyl, butyryl or isobutyryl.

Y is for example —CH$_2$—, —(CH$_2$)$_2$—, —(CH$_2$)$_3$—, —(CH$_2$)$_4$—, —CH$_2$CH)(CH$_3$)— or —CH(CH$_3$)CH(CH$_3$)—.

The rings A may be for example monosubstituted or disubstituted by C$_1$-C$_4$-alkyl or C$_1$-C$_4$-alkoxy.

A suitable bridge member X is for example oxygen, sulfur or a radical of the formula SO, SO$_2$, C$_2$H$_4$,

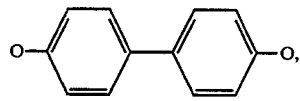

OC—NH—C$_2$H$_4$—NH—CO, OC—O—C$_2$H$_4$—O—CO,

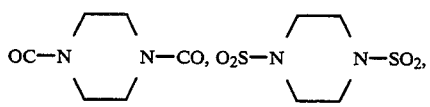

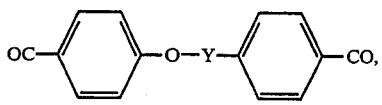

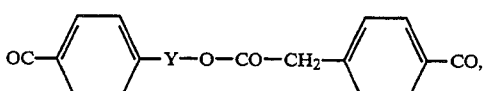

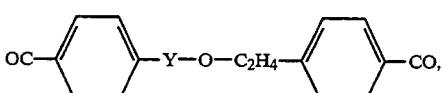

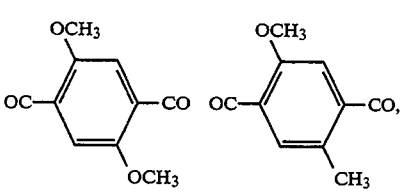

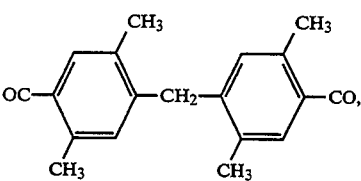

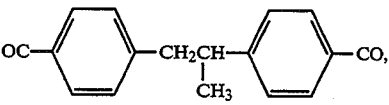

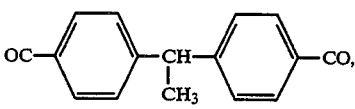

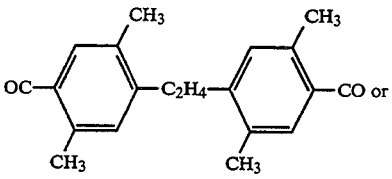

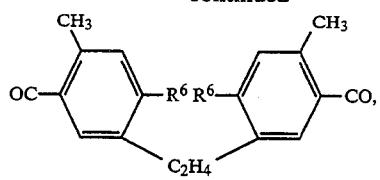

where R$^6$ is in each case hydrogen or methyl and Y is in each case as defined above.

Preference is given to azo dyes of the formula I where n is 1 or 2 and L$^1$ is methyl.

Preference is further given to azo dyes of the formula I where L$^2$ is hydroxysulfonyl.

Emphasis must be given to azo dyes of the formula I where q is 2 and D is a radical of the formula

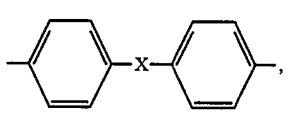

where X is as defined above.

Of particular suitability are azo dyes of the formula I where X is a radical of the formula

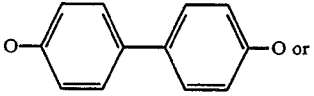

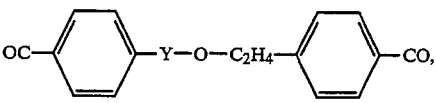

where Y is C$_1$- or C$_2$-alkylene.

Also of particular suitability are azo dyes of the formula I where X is a radical of the formula

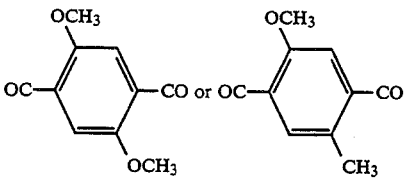

Also of particular suitability are azo dyes of the formula I where n is 2.

The azo dyes of the formula I according to the invention can be obtained in a conventional manner, for example by diazotizing a diazo component of the formula III D(—NH$_2$)$_w$            (III), where D is as defined above and w is 1 or 2, and coupling with a pyridone of the formula IV

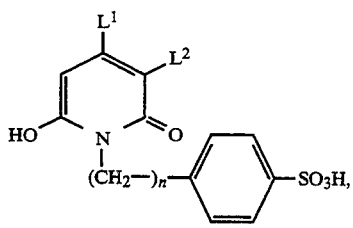

where n, $L^1$ and $L^2$ are each as defined above. Depending on the number w of amino groups, the diazo component III and the pyridone IV are used either in equimolar proportions or in a molar ratio of 1:2.

The azo dyes of formula I according to the invention are advantageous for dyeing natural or synthetic substrates, for example wool, leather or polyamide. The dyeings obtained have good end-use fastness properties.

Furthermore, they are suitable for the ink jet process.

Embodiments of the invention will now be more particularly described by way of example.

EXAMPLE 1

36.9 g of the compound of the formula

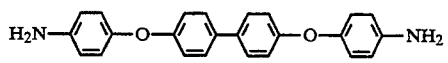

were stirred up with 85 ml of concentrated hydrochloric acid, 25 ml of glacial acetic acid and 1 g of an acidic wetting agent. After cooling to 0° C., 65 ml of a 23% strength by weight aqueous sodium nitrite solution were added with a little ice to obtain a clear solution, which was stirred at from 0° to 4° C. for 3.5 hours. Excess nitrous acid was then destroyed with amidosulfuric acid, and the diazonium salt solution was run into a solution obtained as follows:

78 g of the pyridone of the formula

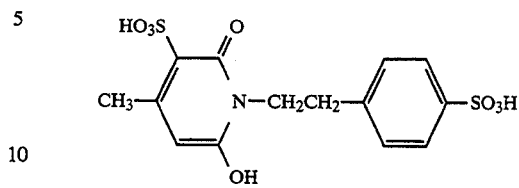

were dissolved in 350 ml of water at pH 7 with sodium hydroxide solution. The solution was then cooled down to 10° C.

While the diazonium salt solution was being added, the reaction mixture was further cooled and buffered with sodium hydroxide solution to a pH of from 4 to 5. After the coupling reaction had ended, the water was removed. This left 312 g of a product containing 125 g of the dye of the formula

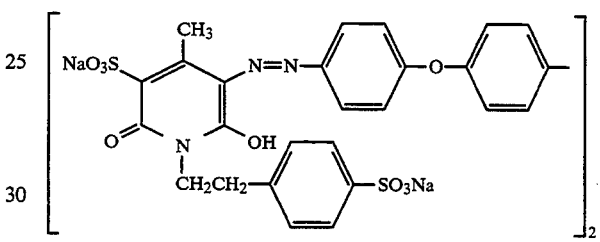

and 187 g of sodium chloride.

The dye gives a yellow solution in water and dyes leather, polyamide and wool in a deep fast golden yellow shade.

The same method gives the dyes listed hereinafter:

TABLE 1

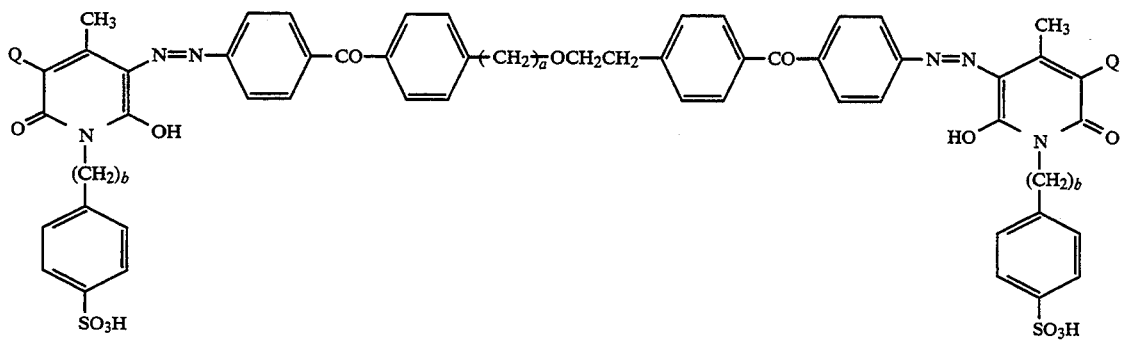

| Ex. No. | b | a | Q | Hue |
|---|---|---|---|---|
| 2 | 1 | 1 | SO$_3$H | greenish yellow |
| 3 | 2 | 1 | SO$_3$H | greenish yellow |
| 4 | 1 | 2 | SO$_3$H | greenish yellow |
| 5 | 2 | 2 | SO$_3$H | greenish yellow |
| 6 | 2 | 1 | CONH$_2$ | greenish yellow |
| 7 | 2 | 1 | COCH$_3$ | greenish yellow |
| 8 | 2 | 2 | CONH$_3$ | greenish yellow |
| 9 | 2 | 2 | COCH$_3$ | greenish yellow |

TABLE 2

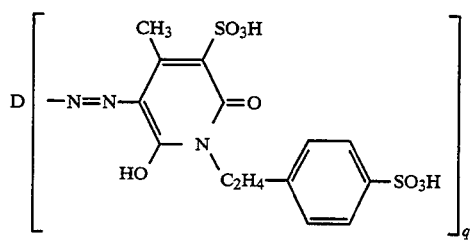

| Ex. No. | D | q | Hue on leather |
|---|---|---|---|
| 10 | 4,4'-oxydiphenylene | 2 | golden yellow |
| 11 | 3-nitro-4-(4-sulfo phenylthio)phenyl — N=N — 2,5-dimethylphenyl | 1 | reddish orange |
| 12 | 4,4'-(ethane-1,2-diyl)diphenylene | 2 | yellow |
| 13 | 3-(4-methylphenylsulfonyloxy)phenyl | 1 | yellow |
| 14 | 4,4'-(ethylenebis(iminocarbonyl))diphenylene | 2 | yellow |
| 15 | 4,4'-(ethylene-1,2-dioxydicarbonyl)diphenylene | 2 | yellow |
| 16 | 3,3'-(ethylene-1,2-dioxydicarbonyl)diphenylene | 2 | strongly greenish yellow |
| 17 | 4,4'-(piperazine-1,4-diyldisulfonyl)diphenylene | 2 | greenish yellow |
| 18 | 3,3'-sulfonyldiphenylene | 2 | greenish yellow |

TABLE 2-continued
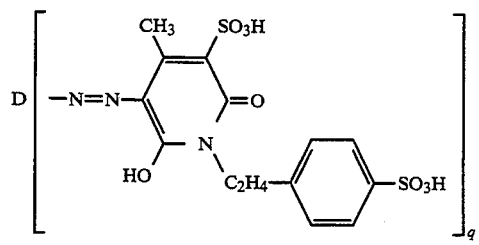
| Ex. No. | D | q | Hue on leather |
|---|---|---|---|
| 19 | | 2 | greenish yellow |
| 20 | | 2 | yellow |
| 21 | | 2 | yellow |
| 22 | | 2 | yellow |
| 23 | | 2 | yellow |
| 24 | | 2 | |

TABLE 3

Common structure: benzene ring with (HO$_3$S)$_r$ substituent, a 1,2,4-oxadiazole (with C$_6$H$_5$) group, and N=N—K azo linkage.

| Ex. no. | r | K | Hue |
|---|---|---|---|
| 25 | 0 | 6-hydroxy-4-methyl-3-sulfo-1-(2-(4-sulfophenyl)ethyl)-2-pyridone coupler (OH, CH$_3$, HO$_3$S, N—CH$_2$CH$_2$—C$_6$H$_4$—SO$_3$H) | yellow |
| 26 | 0 | 6-hydroxy-4-methyl-3-sulfo-1-(4-sulfobenzyl)-2-pyridone (OH, CH$_3$, HO$_3$S, N—CH$_2$—C$_6$H$_4$—SO$_3$H) | yellow |
| 27 | 1 | 6-hydroxy-4-methyl-3-acetyl-1-(4-sulfobenzyl)-2-pyridone (OH, CH$_3$, CH$_3$OC, N—CH$_2$—C$_6$H$_4$—SO$_3$H) | yellow |
| 28 | 1 | 6-hydroxy-4-methyl-3-carbamoyl-1-(4-sulfobenzyl)-2-pyridone (OH, CH$_3$, H$_2$NOC, N—CH$_2$—C$_6$H$_4$—SO$_3$H) | yellow |
| 29 | 1 | 6-hydroxy-4-methyl-3-carbamoyl-1-(2-(4-sulfophenyl)ethyl)-2-pyridone (OH, CH$_3$, H$_2$NOC, N—CH$_2$CH$_2$—C$_6$H$_4$—SO$_3$H) | yellow |
| 30 | 1 | 6-hydroxy-4-methyl-3-acetyl-1-(2-(4-sulfophenyl)ethyl)-2-pyridone (OH, CH$_3$, C$_3$OC, N—CH$_2$CH$_2$—C$_6$H$_4$—SO$_3$H) | yellow |

We claim:

1. Azo dyes of the formula I

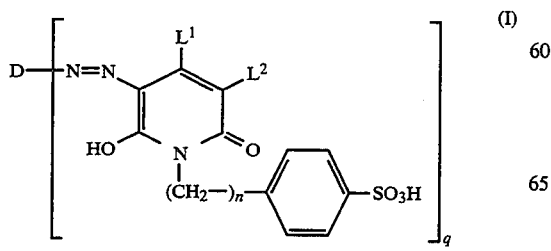

where
n is from 1 to 4
q is 1 or 2,
L$^1$ is hydrogen or C$_1$–C$_3$-alkyl,
L$^2$ is acetyl or hydroxysulfonyl, and, when q=1,
D is a radical of the formula

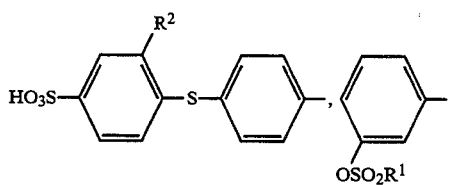

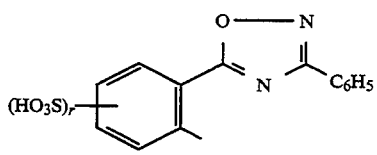

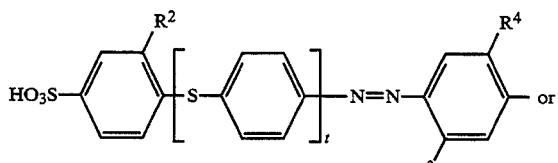

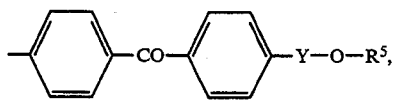

where r is 0 or 1, t is 0 or 1, $R^1$ is phenyl or $C_1$–$C_4$-alkylphenyl, $R^2$ is hydrogen or nitro, $R^3$ and $R^4$ are each independently of the other hydrogen, $C_1$–$C_4$-alkyl or $C_1$–$C_4$-alkoxy, $R^5$ is hydrogen or $C_1$–$C_4$-alkanoyl, Y is $C_1$–$C_4$-alkylene, or, when q=2, is a radical of the formula

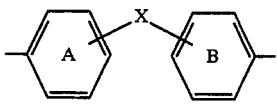

where X is a bridge member and rings A and B may each be substituted independently of one another, wherein the radicals

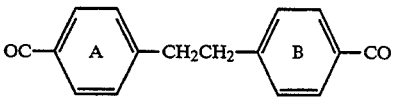

and

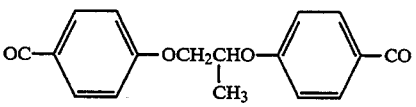

are excluded as bridge members.

2. Azo dyes as claimed in claim 1, wherein n is 1 or 2 and $L^1$ is methyl.

3. Azo dyes as claimed in claim 1, wherein $L_2$ is hydroxysulfonyl.

4. Azo dyes as claimed in claim 1, wherein q is 2 and D is a radical of the formula

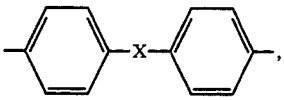

where X is as defined above.

5. A process of dyeing a natural or synthetic substrate selected from the group consisting of wool, polyamide, and leather, comprising contacting said substrate with an azo dye as claimed in claim 1.

* * * * *